July 25, 1939. G. KLOZ 2,167,304
SUPERVISION OF THE UNIFORMITY OF GALVANIC BATHS
Filed May 12, 1936
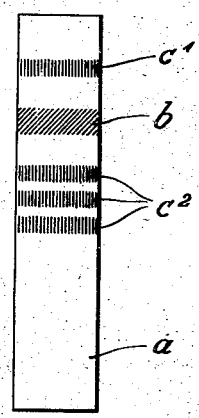
Inventor:
G. Kloz Patented July 25, 1939

2,167,304

UNITED STATES PATENT OFFICE 2,167,304

SUPERVISION OF THE UNIFORMITY OF GALVANIC BATHS

Gerhard Kloz, Leipzig, Germany

Application May 12, 1936, Serial No. 79,397

3 Claims. (Cl. 23—230)

In galvanotechnics the accurate maintenance of certain pH values is of importance in the case of nickel and other galvanic baths for producing a satisfactory deposition. Recent researches have shown that the pH measurement acquires an important role in the control of potassium cyanide copper baths, brass baths and cadmium baths, amongst others.

Electrical measuring appliances do not come into question in practical operation for such measurements on account of their being so bothersome. Also measurement with the hydrogen electrode has its difficulties insofar as it can be used at all, since it is very strongly influenced by uncontrollable impurities or additions to the baths. The quinhydrone electrode shows a salt error at high salt concentrations, which again practically cannot always be eliminated by measurement with the hydrogen electrode.

The simplest method of effecting pH measurements with colour indicators meets with difficulties on account of the partly strong and furthermore varying colour of the baths themselves. It is true that the colour of the bath itself can be eliminated with the aid of a comparator; owing to the high salt concentration, however, the colour change of the two colour indicators which practically alone come into question is so influenced that usually comparisons cannot be made with buffer solutions since the colorations do not agree. A separate colour standard must therefore be mixed. As above mentioned this is a case in which the colour standard cannot be gauged with certainty with electro-metric measurement. Colorimetric and electro-metric measurement show errors of practically the same order of size. For practical use a mean value is obtained when a large number of baths of the most varied kinds are brought to all possible pH values. These mean values of the measurements with the quinhydrone electrodes and those of the measurements with colour indicators are the same. For the practical man, however, even this colorimetric method is too bothersome. In order to be able to effect accurate comparisons the individual solutions, colour indicators and for example nickel bath must be accurately measured off. The colour standard itself must be frequently controlled in order to ensure that its colour has not suffered by the action of light. The simplification of the apparatus which is aimed at with the foil colorimeter does not mean any gain in time since the measurement requires some minutes and a separate colour standard is always required.

These drawbacks are all removed by the method forming the subject of the invention for supervising the uniformity of galvanic baths by determining the pH value of the baths repeatedly at definite time intervals; the method consists in this that the colour change of a paper saturated with an indicator which changes colour within the pH range of the bath and then dipped in the bath, is compared with a table containing the different colour changes of this indicator and which has been previously likewise dipped into the bath. According to the nature of the galvanic bath being supervised, and the pH value which is to be maintained in this bath, indicator liquids of the most different kind come into question. Whilst in the case of normal nickel baths a pH range of 4.5 to 6.7 is used, modern high conductivity baths work in exceptional cases with pH numbers of 1.0 to 2.0. Again in baths containing potassium cyanide pH ranges of 9.5 to 14.5 occur, acid copper baths work in a pH range of 0.4 to 1.0. Accordingly almost all pH ranges from zero upwards are of significance for the control of galvanic baths. Indicator liquids are known for the most varied pH ranges. In order to examine nickel baths, bromthymol blue may for example be used as indicator liquid, which changes colour in the pH range 6 to 8. Bromthymol blue has a greenish yellow appearance when not wetted. At a pH value of 6, its colour changes into yellow, at a pH value of 7 into green, and at a pH value of 8 into blue. These three tones of colour would have to be contained on the colour table with which the moistened indicator paper is compared. Instead of bromthymol blue, dichlorphenolsulphone phthalein could also be used; this changes colour in the pH range of 5 to 7. When not wet dichlorphenolsulphone phthalein has a yellow brown appearance. With increasing pH value it changes through yellow into brown, then becomes red and finally purple or crimson. The comparative colour table to be used with this indicator paper must have these five tones of colour.

For the examination of acid copper baths methyl violet is a suitable indicator; this indicator has a blue appearance when not wetted and changes colour in the pH range 0–3. The colour changes pass through ice blue, green, bright green into yellow.

For examining alkaline baths, like cadmium baths for example, a suitable indicator is tropaeoline O; this indicator, unwetted, has a lemon yellow appearance and in the pH range 12–14 passes through orange into brown-red.

Of course instead of using multi-coloured indicators, single coloured indicators could be employed. The comparative colour tables used with these indicator papers would then have the different nuances of that color into which the indicator turns.

In order to simplify the process separate comparison colour tables are preferably not used, the comparison colours on the contrary being directly applied to the paper strip which is impregnated at one place with an indicator liquid. Such a paper is shown on the accompanying drawing. $a$ indicates the absorptive paper, $b$ that place of the paper which is impregnated with the indicator liquid, whilst the strips $c^1$, $c^2$ indicate strips of colour. The colour strip $c^1$ preferably agrees with the colour of the place $b$ impregnated with the indicator, so that by comparing $b$ with $c^1$ after wetting it can be recognized whether any change in colour of the impregnated place $b$ has set in at all. The strips $c^2$ are differently coloured, and in fact so that they correspond to the different colour changes of the indicator. If the place $b$ is impregnated with bromthymol blue for example, then the strip $c^1$ would have a greenish yellow appearance, while the strips $c^2$ would show, from bottom upwards, yellow, green and finally a blue colour.

Generally speaking the reagent paper is not adjusted to neutrality. According to its manner of production and nature it exhibits an acid to alkaline reaction after being moistened. The reagent paper used, therefore advantageously has a pH value coming within that pH range within which the indicator on the paper changes colour. If this indicator, as in the case of bromthymol blue for example, changes colour in the pH range 6–8, one will not use a paper having a pH value of say 3, but a paper with a pH value between 6–8. If the pH value of the paper is considerably removed from the pH range in which the indicator it bears changes colour, then the accuracy of the measurement is very much impaired owing to this difference. This adverse effect makes itself noticeable by the fact that the colour change takes place at some other pH value than would be the case with a neutral paper.

Since both the comparison colours and the indicator are simultaneously immersed into the liquid being investigated the advantages are as follows:

The strongly varying intrinsic colour of the baths is compensated for without a comparator. The comparison is absolute. The colour standard actually is a standard since it is always used freshly prepared, uninfluenced by light; the reading off takes place forthwith since the colour adjustment takes place instantly. All measuring off, glass appliances, colour tables, comparison foils and so forth are dispensed with. The properties of different bath compositions can be taken into account without difficulty.

What I claim is:

1. A method of ascertaining the pH value of a liquid, e. g. a galvanic bath, which consists in dipping into the liquid a paper saturated with an indicator adapted to change colour over a pH range which includes the pH value of the liquid and also a piece of the same paper bearing the conversion colours of this indicator for individual pH values within the range, and comparing the colour change of the former paper with the colours borne by the latter paper.

2. An indicator paper for ascertaining the pH value of a liquid, e. g. a galvanic bath, consisting of a strip of absorbent paper impregnated at at least one place with an indicator and bearing the conversion colours of this indicator for individual pH values within the pH range of the indicator.

3. An indicator paper for ascertaining the pH value of a liquid, e. g. a galvanic bath, consisting of a strip of absorbent paper impregnated at at least one place with an indicator, the paper having a pH value lying as near as possible to, e. g. within, the pH range of the indicator and bearing the conversion colours of the indicator for individual pH values within said range.

GERHARD KLOZ.